(12) United States Patent
Mitsutani et al.

(10) Patent No.: US 9,106,091 B2
(45) Date of Patent: Aug. 11, 2015

(54) VEHICLE AND VEHICLE CONTROL METHOD

(75) Inventors: Noritake Mitsutani, Toyota (JP); Taiki Kado, Kobe (JP)

(73) Assignees: TOYOTA JIDOSHA KABUSHIKI KAISHA, Toyota-Shi (JP); FUJITSU TEN LIMITED, Kobe-Shi (JP)

( * ) Notice: Subject to any disclaimer, the term of this patent is extended or adjusted under 35 U.S.C. 154(b) by 182 days.

(21) Appl. No.: 13/980,664

(22) PCT Filed: Jan. 23, 2012

(86) PCT No.: PCT/IB2012/000088
§ 371 (c)(1),
(2), (4) Date: Jul. 19, 2013

(87) PCT Pub. No.: WO2012/101496
PCT Pub. Date: Aug. 2, 2012

(65) Prior Publication Data
US 2013/0300363 A1    Nov. 14, 2013

(30) Foreign Application Priority Data

Jan. 27, 2011  (JP) ................. 2011-015068

(51) Int. Cl.
  *H02J 7/00*  (2006.01)
  *B60L 1/00*  (2006.01)
  *B60L 3/00*  (2006.01)
  (Continued)

(52) U.S. Cl.
  CPC ............ *H02J 7/007* (2013.01); *B60L 1/003* (2013.01); *B60L 3/003* (2013.01); *B60L 3/0046* (2013.01); *B60L 3/04* (2013.01); *B60L 3/12* (2013.01); *B60L 11/123* (2013.01); *B60L 11/14* (2013.01); *B60L 11/1811* (2013.01); *B60L 11/1816* (2013.01); *B60L 11/1857* (2013.01); *B60L 2240/34* (2013.01); *B60L 2240/36* (2013.01); *B60L 2240/525* (2013.01); *B60L 2240/545* (2013.01); *B60L 2250/16* (2013.01); *B60L 2260/42* (2013.01); *B60L 2260/58* (2013.01); *Y02T 10/6217* (2013.01); *Y02T 10/705* (2013.01); *Y02T 10/7005* (2013.01); *Y02T 10/7011* (2013.01); *Y02T 10/7016* (2013.01); *Y02T 10/7022* (2013.01); *Y02T 10/7038* (2013.01); *Y02T 10/7077* (2013.01);
  (Continued)

(58) Field of Classification Search
  None
  See application file for complete search history.

(56) References Cited

U.S. PATENT DOCUMENTS

| 5,656,916 A | 8/1997 | Hotta |
| 7,200,476 B2 * | 4/2007 | Cawthorne et al. ............. 701/51 |

(Continued)

FOREIGN PATENT DOCUMENTS

| EP | 2169802 A1 | 3/2010 |
| EP | 2197086 A1 | 6/2010 |

(Continued)

*Primary Examiner* — Leigh Garbowski
(74) *Attorney, Agent, or Firm* — Kenyon & Kenyon LLP

(57) ABSTRACT

A vehicle that is chargeable using power from an external power source includes: a chargeable electric storage device; a charging device that charges the electric storage device by using the power from the external power source; and a control device that, based on maximum supply power that is able to be supplied to the electric storage device and based on actual charge power actually supplied to the electric storage device, calculates a shortfall with respect to charge power supplied to the electric storage device in a case where charging is performed at the maximum supply power, and stores information relating to a causal factor for the shortfall.

15 Claims, 10 Drawing Sheets

(51) Int. Cl.
*B60L 3/04* (2006.01)
*B60L 3/12* (2006.01)
*B60L 11/12* (2006.01)
*B60L 11/14* (2006.01)
*B60L 11/18* (2006.01)

(52) U.S. Cl.
CPC ............ *Y02T 90/127* (2013.01); *Y02T 90/14* (2013.01); *Y02T 90/167* (2013.01)

(56) References Cited

U.S. PATENT DOCUMENTS 8,058,848 B2 * 11/2011 Mitsutani ................ 320/137

| | | |
|---|---|---|
| 2010/0127665 A1 | 5/2010 | Mitsutani |
| 2014/0091767 A1 * | 4/2014 | Tamura et al. ............ 320/126 |

FOREIGN PATENT DOCUMENTS

| | | |
|---|---|---|
| JP | 2007-006628 A | 1/2007 |
| JP | 2008-211955 A | 9/2008 |
| JP | 2009-100569 A | 5/2009 |
| JP | 2010-032459 A | 2/2010 |
| JP | 2010-119208 A | 5/2010 |

* cited by examiner

VEHICLE AND VEHICLE CONTROL METHOD

CROSS REFERENCE TO RELATED APPLICATION

This is a national phase application based on the PCT International Patent Application No. PCT/IB2012/000088 filed on Jan. 23, 2012, claiming priority to Japanese Patent Application No. 2011-015068 filed Jan. 27, 2011, the entire contents of both of which are incorporated herein by reference.

BACKGROUND OF THE INVENTION

1. Field of the Invention

The invention relates to a vehicle and to a vehicle control method, and more specifically, to a log function for factors for charging time extension in a vehicle that is chargeable using external power.

2. Description of Related Art

Vehicles that run using a driving force generated from power stored in an electric storage device (for instance, a secondary battery, a capacitor and the like) have received attention as environmentally-friendly vehicles. Such vehicles include, for instance, electric vehicles, hybrid vehicles, fuel-cell vehicles and the like. Technologies have been proposed for charging the electric storage device installed in such vehicles by way of a commercial power source having high power-generation efficiency.

Conventional hybrid vehicles include vehicles having, as in the case of electric vehicles, an in-vehicle electric storage device that is chargeable from a power source external to the vehicle (hereafter also referred to as "external power source"). For instance, so-called "plug-in hybrid vehicles" are available such vehicles having an electric storage device that is chargeable from an ordinary domestic power source, through connection, by way of a charging cable, between an outlet provided in a house and a charging port (may be also referred to as "inlet") provided in the vehicle. This can be expected to result in increased fuel consumption efficiency of the hybrid vehicle.

Japanese Patent Application Publication No. 2009-100569 (JP-A-2009-100569) describes a technique wherein, in a vehicle capable of being charged using an external power source, charging time is extended, before or after a predefined charging time, if it is determined that a required charging amount is not obtained within a lapse of time from start of charging until a predefined time interval is over, when the vehicle is charged using an external power source.

In a vehicle capable of being charged using an external power source, charging time may be extended (the point in time at which the charging time is over may be delayed) during execution of charging using an external power source, depending on the state of devices that are related to charging and that are installed in the vehicle, for instance, the electric storage device, the charging device and the like, or depending on the state of use of auxiliary devices in the vehicle.

Thus, driving may be impossible or mileage may be limited, on account of charging not being yet complete, when the user attempts to drive the vehicle expecting charging to be complete. In such cases, the user may have a feeling of uncertainty regarding the system, if the factor underlying the extension of charging time is unclear. The user may mistake that charging time extension for a system malfunction or anomaly, and may make a complaint accordingly.

SUMMARY OF THE INVENTION

The invention allows recognizing retrospectively the factor for charging time extension in a vehicle that is chargeable using an external power source.

A vehicle according to a first aspect of the invention is a vehicle that is chargeable using power from an external power source. The vehicle includes a chargeable electric storage device; a charging device that charges the electric storage device using the power from the external power source; and a control device. Based on maximum supply power that is able to be supplied to the electric storage device and based on actual charge power actually supplied to the storage device, the control device calculates a shortfall with respect to charge power supplied to the electric storage device in a case where charging is performed at the maximum supply power, and stores information relating to a causal factor for the shortfall.

The control device may store the information relating to the causal factor for the shortfall when an accumulated value, which results from accumulating over time a value based on the shortfall calculated for every predefined sampling period, exceeds a predefined threshold value.

The causal factor for the shortfall includes a shortage of the charge power arising from lowering of a charge power upper limit value of the electric storage device.

The causal factor for the shortfall may include a shortage of the charge power arising from a limitation imposed on output power of the charging device.

A causal factor for the shortfall may include the shortage of the charge power arising from the limitation imposed on the output power of the charging device to protect the charging device against overheating.

The vehicle may further include an auxiliary device configured to be operated using output power of the charging device during a charging operation. The causal factor for the shortfall may include a shortage of the charge power arising from power consumption by the auxiliary device in a case where the auxiliary device is used during the charging operation.

The vehicle may further include an auxiliary device configured to be operated using output power of the charging device during a charging operation. The causal factor for the shortfall may include at least one from among a first factor which is a shortage of the charge power arising from lowering of a charge power upper limit value of the storage device, a second factor which is a shortage of the charge power arising from a limitation imposed on output power of the charging device to protect the charging device against overheating, and a third factor which is a shortage of the charge power arising from power consumption by the auxiliary device in a case where the auxiliary device is used during the charging operation. The control device may store the information on each of the first factor, the second factor, and the third factor, if an accumulated value resulting from accumulating over time a total sum value of values that are based on respective shortfalls due to the first factor, the second factor, and the third factor, calculated for every predefined sampling period, exceeds a predefined threshold value.

The control device may calculate, as the value based on the shortfall, an extension amount from charging time required in the case where charging is performed at the maximum supply power, and may store the information, as information on a factor for extension, when the extension amount exceeds the threshold value.

The information on the factor for extension may include the causal factor for the shortfall and information on the extension amount that arises from the shortfall.

A vehicle control method according to a second aspect of the invention is a method for controlling a vehicle equipped with an electric storage device that is chargeable using power from an external power source. The method includes: based on maximum supply power that is able to be supplied to the electric storage device and based on actual charge power actually supplied to the electric storage device, calculating a shortfall with respect to charge power supplied to the electric storage device in a case where charging is performed at the maximum supply power; and storing information relating to the causal factor for the shortfall.

The above aspects of the invention allow identifying retrospectively the factor for charging time extension in a vehicle that is chargeable using an external power source.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
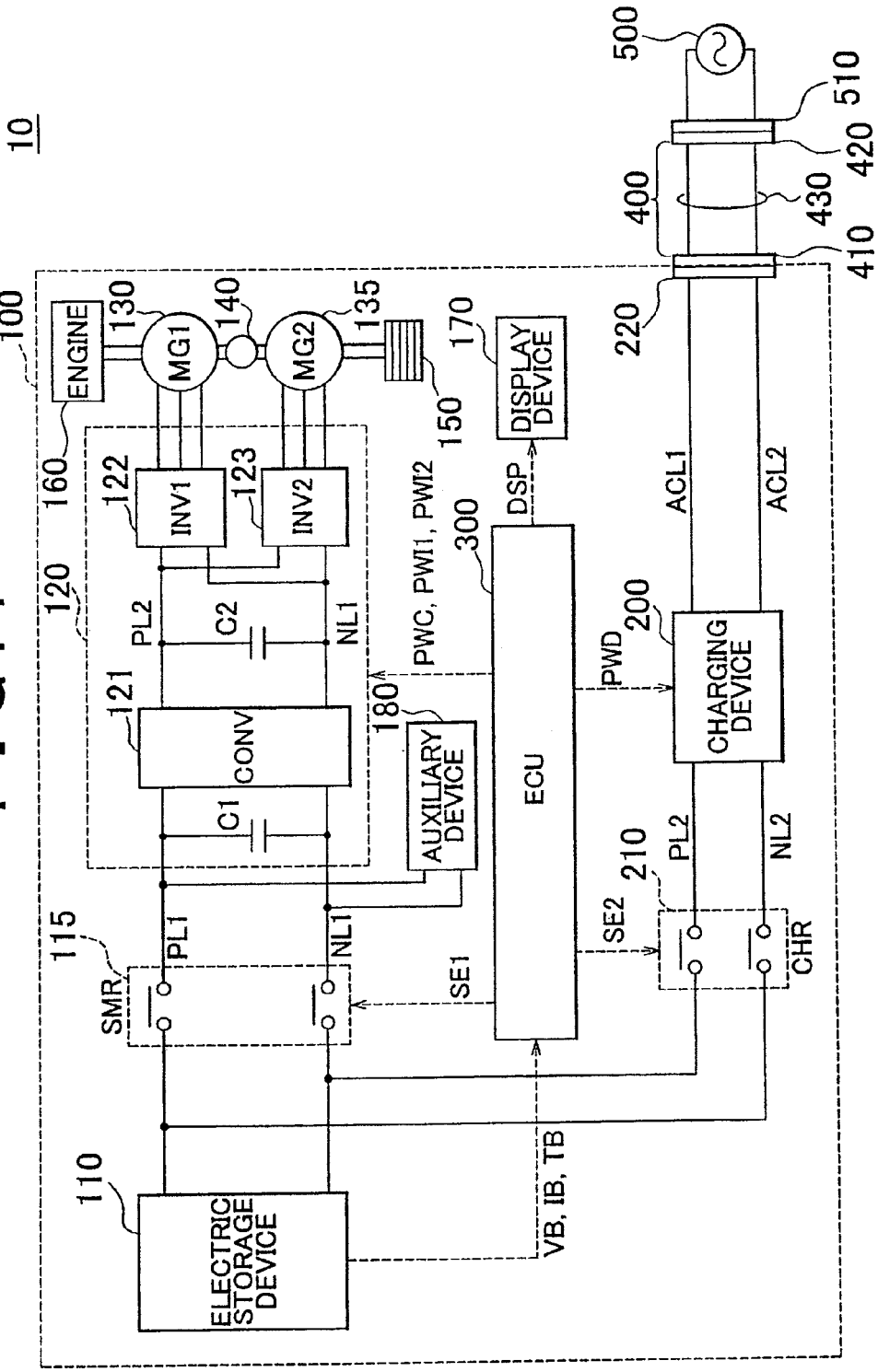
FIG. 1 is an overall block diagram of a charging system including a vehicle according to an embodiment of the invention.

Embodiments of the invention will be described below with reference to accompanying drawings. Identical and equivalent portions in the figures are denoted with identical reference numerals, and a recurrent description thereof will be omitted.

(Basic Configuration of the Vehicle)

FIG. 1 is an overall block diagram of a charging system 10 including a vehicle 100 according to the embodiment.

With reference to FIG. 1, the vehicle 100 is provided with an electric storage device 110, a system main relay (hereafter also referred to (SMR)) 115, a power control unit (PCU) Unit) 120 that is a driving device; motor generators 130, 135; a power transmission gear 140, a drive wheel 150, an engine 160, a display device 170, an auxiliary device 180, and a control device (hereafter also referred to as ECU) 300.

The electric storage device 110 is an electric power storage element configured so as to be capable of being charged and discharged. The electric storage device 110 is configured to include, for instance, a secondary battery such as a lithium ion battery, or a nickel hydride battery, a lead battery, or a cell of an electric storage element such as an electric double-layer capacitor.

The electric storage device 110 is connected, via the SMR 115, to the PCU 120 for driving the motor generators 130, 135. The electric storage device 110 supplies, to the PCU 120, power for generating a driving force in the vehicle 100. The electric storage device 110 stores power generated by the motor generators 130, 135. The output of the electric storage device 110 is, for instance, 200 V.

Ends of relays in the SMR 115 are connected to the positive terminal and the negative terminal of the electric storage device 110. Other ends of the relays in the SMR 115 are connected to a power line PL1 and a ground line NL1 that are connected to the PCU 120. The SMR 115 switches between supply and shutting-off of power between the electric storage device 110 and the PCU 120, based on a control signal SE1 from the ECU 300.

The PCU 120 includes a converter 121, inverters 122, 123, and capacitors C1, C2.

The converter 121 performs voltage conversion between the power line PL1 and the ground line NL1, and a power line PL2 and the ground line NL1, based on a control signal PWC from the ECU 300.

The inverters 122, 123 are connected in parallel to the power line PL2 and the ground line NL1. The inverters 122, 123 convert direct current (DC) power supplied by the converter 121 to altering current (AC) power, based on control signals PWI1, PWI2 from the ECU 300, and drive the motor generators 130, 135, respectively.

The capacitor C1 is provided between the power line PL1 and the ground line NL1, and reduces fluctuation of voltage across the power line PL1 and the ground line NL1. The capacitor C2 is provided between the power line PL2 and the ground line NL1, and reduces fluctuation of voltage across the power line PL2 and the ground line NL1.

Each of the motor generators 130, 135 is an AC rotating electrical machine, for instance, a permanent magnet-type synchronous electric motor including a rotor in which permanent magnets are embedded.

The vehicle 100 travels using the output torque of the motor generators 130, 135 that is transmitted to the drive wheel 150 and the engine 160 through a power transmission gear 140 made up of a reducer and/or a power split mechanism. The motor generators 130, 135 generate power, using the rotational force of the drive wheel 150, during the regenerative braking operation of the vehicle 100. The generated power is converted, by the PCU 120, to charge power to the electric storage device 110. In the embodiment, the motor generator 130 operates solely as a generator for power generation upon being driven by the engine 160, and the motor generator 135 operates solely as an electric motor for driving the drive wheel 150 to enable the vehicle 100 to travel.

In the embodiment, an example of a configuration in which there are provided two pairs of the motor generator and the inverter is described, but the configuration may include one pair of the motor generator and the inverter, or two or more such pairs.

In the embodiment, as described above, the vehicle 100 is exemplified as a hybrid vehicle, but the configuration of the vehicle 100 is not limited, so long as the vehicle is equipped with an electric motor for generating vehicle driving force using power from the electric storage device 110. That is, the vehicle 100 may be a hybrid vehicle wherein a vehicle driving force is generated by an engine and an electric motor, as in FIG. 1, and may also be an electric vehicle, fuel cell vehicle or the like equipped with no engine.

The display device 170 is a device for visually notifying, to a user, anomalies determined by the ECU 300, as well as other information items, based on a display signal DSP from the ECU 300. The display device 170 includes an indicator lamp such as lamp, a light-emitting diode (LED) or the like, or a display panel such as a liquid crystal display screen or the like.

The auxiliary device 180 is connected to the power line PL1 and the ground line NL1, and operates using power from the electric storage device 110. The auxiliary device 180 includes, for instance, an auxiliary battery and an auxiliary load such as a DC/DC converter, an air conditioner, and an audio system. Upon charging using an external power source, preferably, the power source voltage for driving the ECU 300 and the below-described charging device 200 is supplied by a DC/DC converter for regulating the power consumption in the auxiliary battery.

The vehicle 100 is further provided with a charging device 200, a charging relay CHR 210 and a connection unit 220, as a configuration for charging the electric storage device 110 using power from an external power source 500.

The connection unit 220 is provided in the body of the vehicle 100, for receiving power from the external power source 500. A charging connector 410 of a charging cable 400 is connected to the connection unit 220. A plug 420 of the charging cable 400 is connected to an outlet 510 of the external power source 500, to cause power from the external power source 500 to be transmitted to the vehicle 100 via a cabling section 430 of the charging cable 400. A charging circuit shut-off device (not shown) for switching between supply and shut-off of power to the vehicle 100 from the external power source 500, is provided in the cabling section 430 of the charging cable 400.

The charging device 200 is connected to the connection unit 220 via power lines ACL1, ACL2. The charging device 200 is connected to the electric storage device 110 via the CHR 210. The charging device 200 converts AC power supplied by the external power source 500 to DC power with which the electric storage device 110 can be charged, based on a control signal PWD from the ECU 300.

Ends of relays in the CHR 210 are connected to the positive terminal and the negative terminal of the electric storage device 110. Other ends of relays in the CHR 210 are connected to the power line PL2 and a ground line NL2 that are connected to the charging device 200. The CHR 210 switches between supply and shut-off of power to the electric storage device 110 from the charging device 200, based on a control signal SE2 from the ECU 300.

The ECU 300 includes a central processing unit (CPU), a memory device and an input/output buffer, not shown in FIG. 1. The ECU 300 receives the input of signals from, for instance, various sensors; outputs control signals to respective devices; and controls the vehicle 100 and various devices. The above control is not limited to software processes, and may be implemented by dedicated hardware (electronic circuits).

The ECU 300 receives detected values of voltage VB, current IB and temperature TB of the electric storage device 110, from a voltage sensor, a current sensor, and a temperature sensor, respectively, which are not shown in the figures. The ECU 300 calculates a state of charge (SOC) of the electric storage device 110 based on the above information. The ECU 300 calculates a charge power upper limit value Win, and a discharge power upper limit value Wout of the electric storage device 110 based on, for instance, the SOC and the temperature TB of the electric storage device 110.

The ECU 300 is depicted in FIG. 1 in the form of a single control device, but the configuration may be such that individual control devices are provided for respective devices or functions.

In such vehicles capable of being charged using an external power source, the charging operation is preferably completed in as short a time as possible. Ideally, therefore, the charging operation is preferably performed at the maximum power that can be supplied by the external power source.

In some instances, however, power that is supplied to the electric storage device may be limited on account of various factors. Accordingly, the charging time may be extended in some cases.

In a first instance, power may be limited in order to protect devices involved in the charging operation. In some instances, for example, the power that is received may be limited in order to prevent overvoltage in the electric storage device that receives the charge power; alternatively, the output power of the charging device may be limited in order to protect the device against heat generated by the power conversion operation in the charging device.

Secondly, even if there is no limit imposed by the devices involved in the charging operation, the charge power to the electric storage device may be reduced, in some instances, through usage of the power supplied by the external power source for purposes other than the purpose of charging the electric storage device.

If the charging time is extended on account of a shortfall of charge power with respect to the maximum power that can be supplied, occurrences may arise wherein the vehicle fails to run, or the distance traveled using the driving force that relies on the power from the electric storage device may become shorter, since charging is not yet sufficient, when the user attempts to drive the vehicle expecting charge to be complete.

If the user cannot learn the reason why charging has been extended, he/she may have a sense of uncertainty about the system. The user may mistake the above for a system malfunction or anomaly, and may make a complaint against the dealer.

If the charging operation is extended for some length, therefore, it is necessary to enable retrospective grasping of information relating to the factor for extension.

In the embodiment, therefore, there is performed extension time log control in which information relating to the factor for a charging time extension is stored in a case where the charging time is extended on account of shortfall of power with respect to maximum power that can be supplied, in a vehicle that can be charged using an external power source. This allows grasping, retrospectively, the factor for extension, if any, of the charging time. Any feeling of uncertainty on the part of the user is thus dispelled, and the user can be prevented from making unnecessary complaints.

(Embodiment 1)

Embodiment 1 describes an instance where the charging time is extended as a result of a greater limitation than usual on the allowed charge power in the electric storage device 110.

In the electric storage device 110, there is ordinarily set a charge power upper limit value Win, which is an upper limit value of charge power, and which depends on, for instance, the temperature of the electric storage device 110 and on the SOC, in order to prevent overvoltage caused by reception of excessive charge power. In case of charging using the external power source, the charging device 200 is controlled in such a manner that the charge power does not exceed the charge power upper limit value Win. Much charging time is required in a case where the magnitude of the charge power upper limit value Win is lowered by being limited to be smaller than usual, on account of temperature or the like, as compared to a case where the magnitude of the charge power upper limit value Win is not limited. Charging time may be accordingly extended in such an instance.

Figure 2:
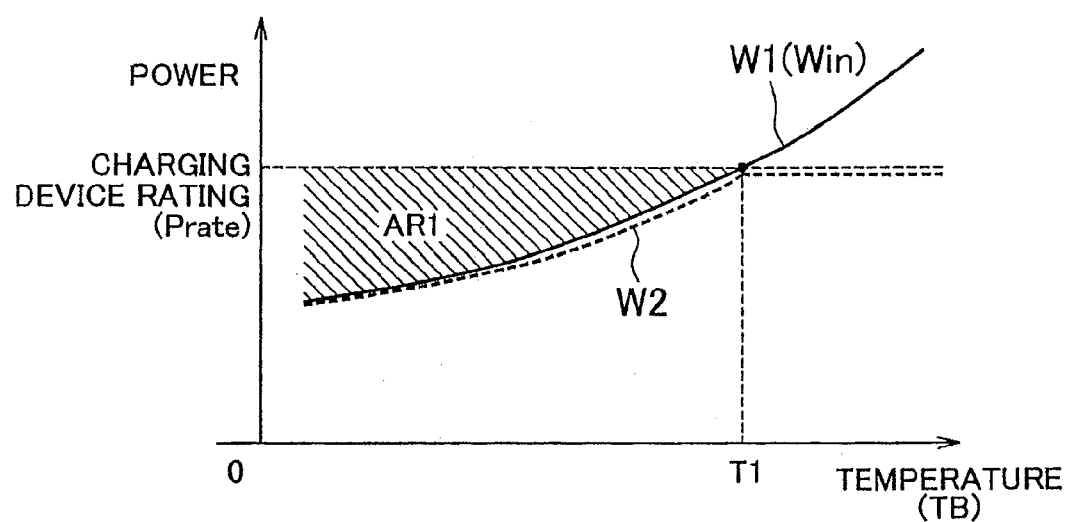
FIG. 2 is a diagram for explaining an example of charge power decrease arising from a charge power upper limit value of an electric storage device in Embodiment 1.

FIG. 2 is a diagram for explaining an example of charge power decrease arising from the charge power upper limit value Win of the electric storage device 110 in Embodiment 1. In FIG. 2, there is explained an instance where the charge power upper limit value Win is further reduced on account of the temperature TB of the electric storage device 110.

With reference to FIG. 2, a curve W1 in the figure denotes the charge power upper limit value Win, and a curve W2 denotes the actual charge power that is actually supplied from the charging device 200 to the electric storage device 110. The charge power upper limit value Win decreases as the temperature drops.

In a case where the temperature TB of the electric storage device 110 is greater than T1, i.e. in a case where the charge power upper limit value Win is greater than a rated output power Prate of the charging device 200, and if no other limits apply, then the electric storage device 110 is supplied with the maximum charge power that the charging device 200 is capable of outputting (i.e. with the rated output power Prate).

When the temperature TB of the electric storage device 110 drops below T1, however, the charge power upper limit value Win becomes smaller than the rated output power Prate of the charging device 200. As a result, there is reduced the charge power supplied from the charging device 200 to the electric storage device 110 (region AR1 in FIG. 2). The power per unit time that is supplied from the charging device 200 to the electric storage device 110 drops thereupon, and hence the time required for charging may become longer than in an instance where the temperature of the electric storage device 110 is higher than T1.

Figure 3:
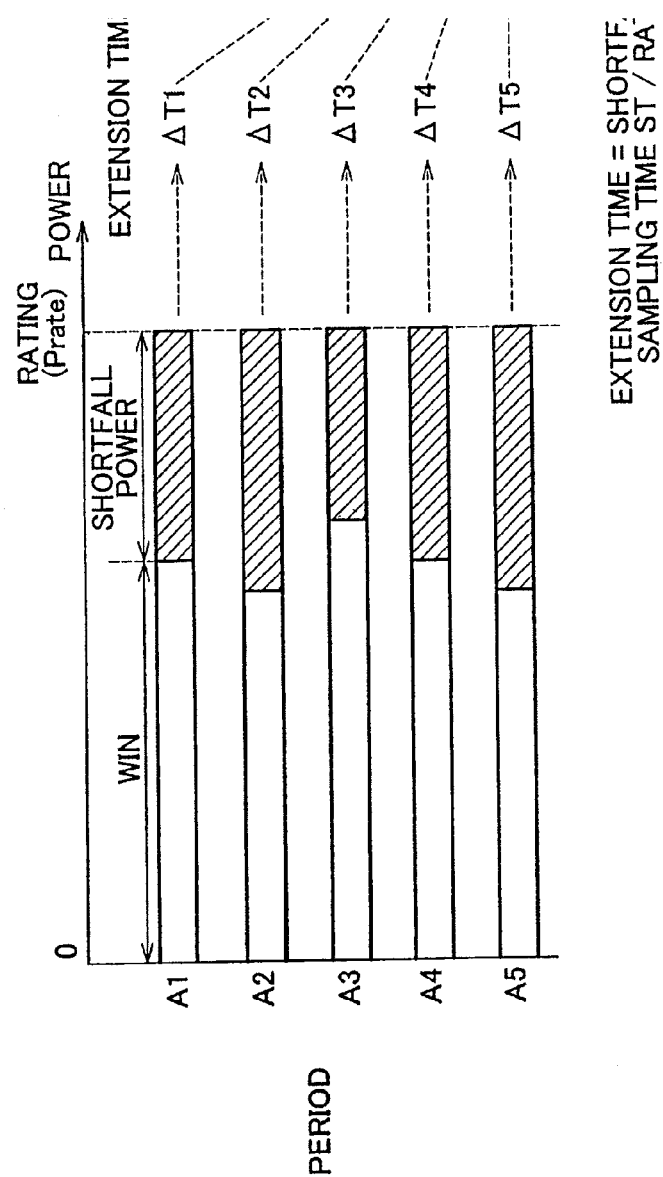
FIG. 3 is a diagram for explaining a method of calculating a charging extension time in Embodiment 1.

An explanation follows next, with reference to FIG. 3, on the outline of a method of calculating a charging extension time and extension time log control in Embodiment 1. With reference to FIG. 3, the ECU 300 compares the charge power upper limit value Win and the rated output power Prate of the charging device 200, at a predefined sampling period (A1, A2, A3 and so forth in FIG. 3) determined based on a control period. If the charge power upper limit value Win drops below the rated power Prate, a value resulting from multiplying a sampling time ST by a ratio of shortfall power (=Prate−Win) with respect to the rated power Prate is calculated, as an extension time ΔT (in FIG. 3, ΔT1, ΔT2 and so forth) in that sampling period, according to Expression (1) below.

$$\Delta T = (Prate - Win) \times ST / Prate \quad (1)$$

The ECU 300 accumulates the extension times ΔT, and when the accumulated value reaches a predefined threshold value α (for instance, one hour), the ECU 300 stores log information denoting the occurrence of the extension time arising from lowering of the charge power upper limit value Win.

Figure 4:
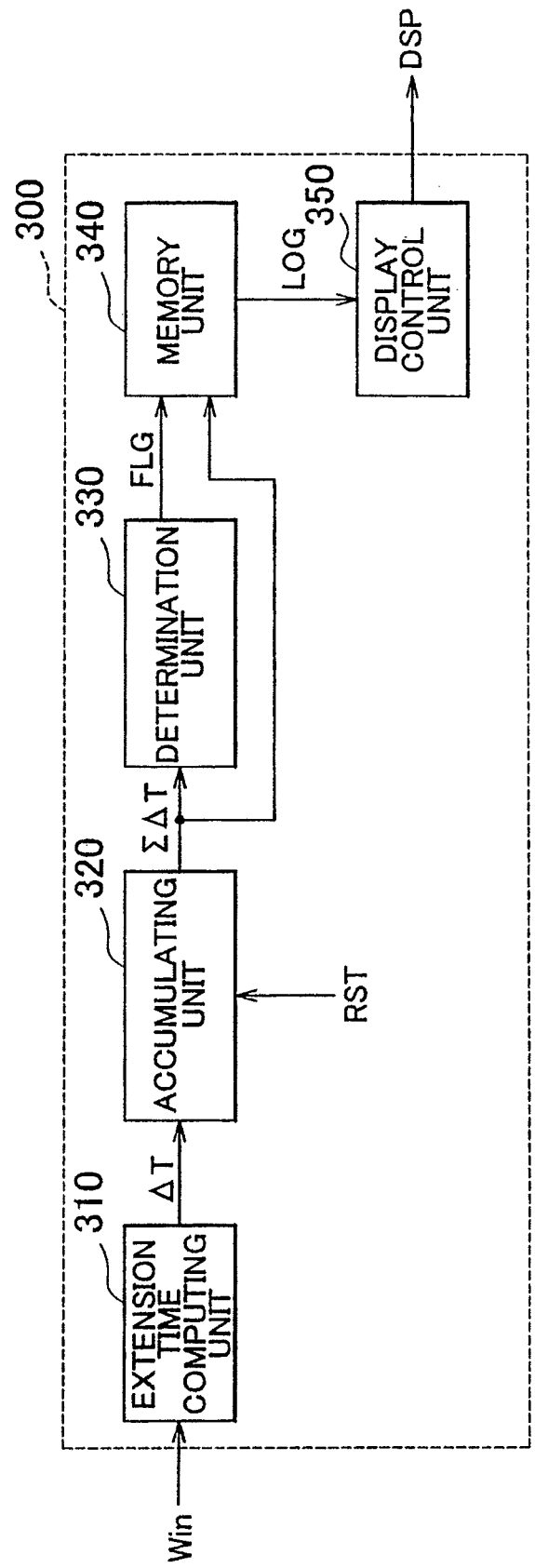
FIG. 4 is a functional block diagram for explaining extension time log control executed by an electronic control unit (ECU) in Embodiment 1.

FIG. 4 is a functional block diagram for explaining extension time log control performed by the ECU 300 in Embodiment 1. Each functional block in the functional block diagram of FIG. 4 may be realized by hardware or software processing in the ECU 300.

With reference to FIGS. 1 and 4, the ECU 300 includes an extension time computing unit 310, an accumulating unit 320, a determination unit 330, a memory unit 340 and a display control unit 350.

The extension time computing unit 310 receives the charge power upper limit value Win. The extension time computing unit 310 calculates the extension time ΔT according to a method such as the one explained using FIG. 3. The extension time computing unit 310 outputs the calculated extension time ΔT to the accumulating unit 320.

The accumulating unit 320 accumulates the extension time ΔT received from the extension time computing unit 310, during execution of charging using the external power source. The accumulating unit 320 outputs the accumulated value ΣΔT to the determination unit 330 and the memory unit 340.

Upon receiving a reset signal RST generated at a predefined timing, such as upon start or upon termination of charging using the external power source, the accumulating unit 320 resets the accumulated value ΣΔT to zero.

The determination unit 330 receives the accumulated value ΣΔT of the extension time from the accumulating unit 320. The determination unit 330 determines whether the accumulated value ΣΔT exceeds the predefined threshold value α. The determination unit 330 sets an extension determination flag FLG, which is the determination result, and outputs the extension determination flag FLG to the memory unit 340. Specifically, for instance, the extension determination flag FLG is set to On, if the accumulated value ΣΔT exceeds the predefined threshold value α. Otherwise, the extension determination flag is set to Off.

The memory unit 340 receives the accumulated value ΣΔT from the accumulating unit 320 and the extension determination flag FLG from the determination unit 330. The memory unit 340 stores, as log information LOG, information that includes the accumulated value ΣΔT, in response to the setting of the extension determination flag to On. The memory unit 340 outputs the stored log information LOG to the display control unit 350, in accordance with a request from the display control unit 350.

The display control unit 350 acquires the stored log information LOG from the memory unit 340, in response to, for instance, the storing of the log information LOG in the memory unit 340, or in accordance with a request from the user. The display control unit 350 outputs a control signal DSP to the display device 170, based on the acquired log information LOG, and causes the content of the log information LOG to be displayed on the display device 170, as a result of which the content of the log information LOG is notified to the user.

Figure 5:
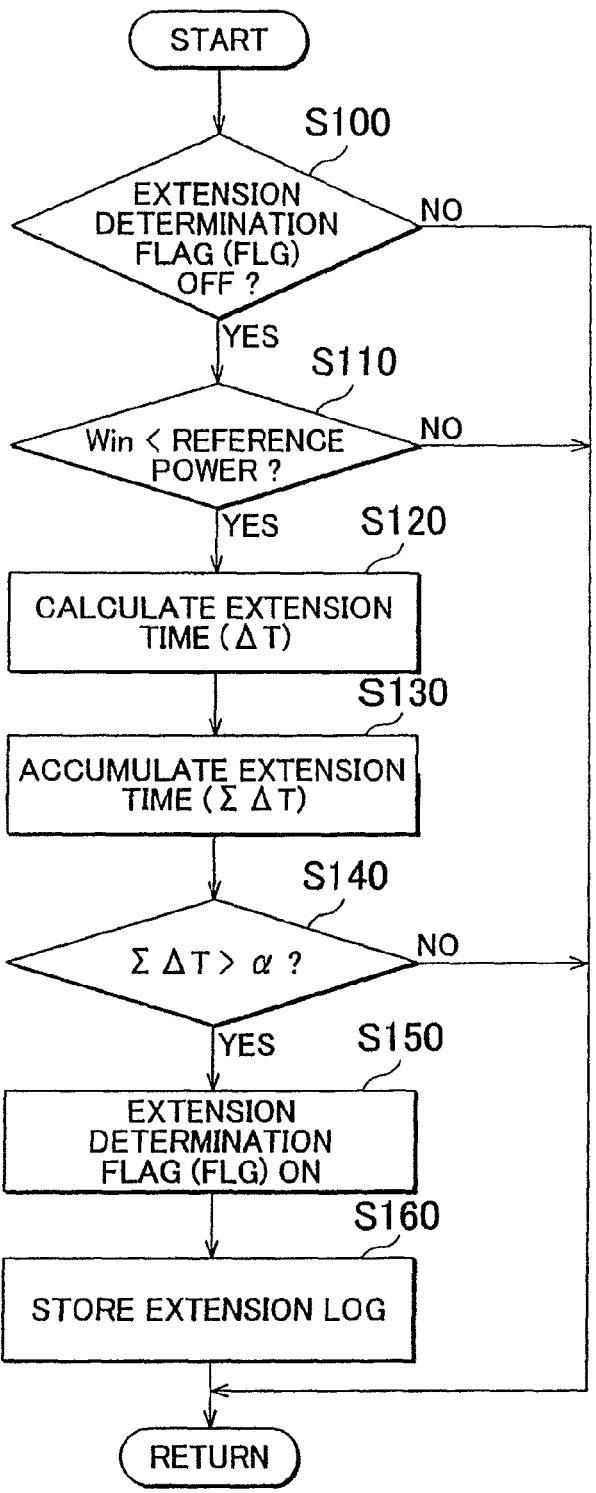
FIG. 5 is a flowchart for explaining in detail an extension time log control processing that is executed by the ECU in Embodiment 1.

FIG. 5 is a flowchart for explaining in detail the extension time log control processing that is executed by the ECU 300 in Embodiment 1. In the flowcharts of FIG. 5 and FIGS. 7, 9, 10 described below, processes are performed through calling, by a main routine, of a program stored beforehand in the ECU 300, and execution of the program at a predefined period. In some steps, alternatively, the processes may be realized by dedicated hardware (electronic circuits).

With reference to FIGS. 1 and 5, the ECU 300 determines whether in step 100 (hereafter, step is shortened to S), the extension determination flag FLG is Off or not.

If the extension determination flag FLG is On (NO in S100), then extension of charging time using the external power source has already been detected, and hence the subsequent steps are skipped, and the process returns to the main routine.

If the extension determination flag FLG is Off (YES in S100), the process proceeds to step S110, and it is determined whether the charge power upper limit value Win is smaller than a reference power. The reference power is defined based on the rated output power of the charging device 200, as described above, or based on the output power of the external power source 500, in a case where the output power of the external power source 500 is smaller than the rated output power of the charging device 200. That is, the reference power may be set to maximum chargeable power in a situation where the charge power is not limited due to the charge power upper limit value Win.

If the charge power upper limit value Win is equal to or greater than the reference power (NO in S110), there is no charging time extension arising from the charge power upper limit value Win, and the process skips the subsequent steps and returns to the main routine.

If the charge power upper limit value Win is smaller than the reference power (YES in S110), the process proceeds to step S120, and, as explained in FIG. 3, the ECU 300 calculates the extension time ΔT for each sampling period, and in S130 accumulates the calculated extension times ΔT.

In S140, the ECU 300 determines whether the accumulated value ΣΔT accumulated in S130 is greater than the predefined threshold value α.

If the accumulated value ΣΔT is equal to or smaller than the threshold value α (NO in S140), the process in the ECU 300 returns to the main routine, and accumulation of the extension time is further continued if the conditions of S100 and S110 are satisfied.

If the accumulated value ΣΔT is greater than the threshold value α (YES in S140), the process proceeds to step S150, and the ECU 300 sets the extension determination flag FLG to On. In S160, the ECU 300 stores log information relating to charging time extension. More specifically, the ECU 300 stores log information that indicates that charging time has been extended on account of lowering of the charge power upper limit value Win of the electric storage device 110. The log information includes information on the extension time.

Although not depicted in FIG. 5, the content of the log information may be displayed on the display device 170 when the log information is stored.

By performing control according to the above-described processes, it becomes possible to store information relating to charging time extension arising from lowering of the charge power upper limit value of the electric storage device. The factor for extension of charging time can be identified retrospectively as a result.

(Embodiment 2)

In the charging device illustrated in FIG. 1, heat may be generated as a result of a power conversion operation wherein power (for instance, AC power) from the external power source is converted to DC power with which the electric storage device can be charged. If the generated heat is excessive, the control unit in the charging device may malfunction, the power paths (for instance, switching elements, terminals, power lines and the like) may deteriorate, and insulation may become impaired. Ordinarily, therefore, the charging device may be provided with a function of reducing output power in order to protect the various units of the charging device against overheating.

The power per time that is supplied to the electric storage device drops upon activation of a protective function in the charging device during charging using the external power source, for instance as in the above-described example of protection against overheating. Charging time may be accordingly extended in such an instance.

In Embodiment 2, therefore, an instance is explained wherein, for example, there is stored log information relating to extension in a case where charging time is extended as a result of an output power limitation in the charging device by a protective function of the charging device.

Figure 6:
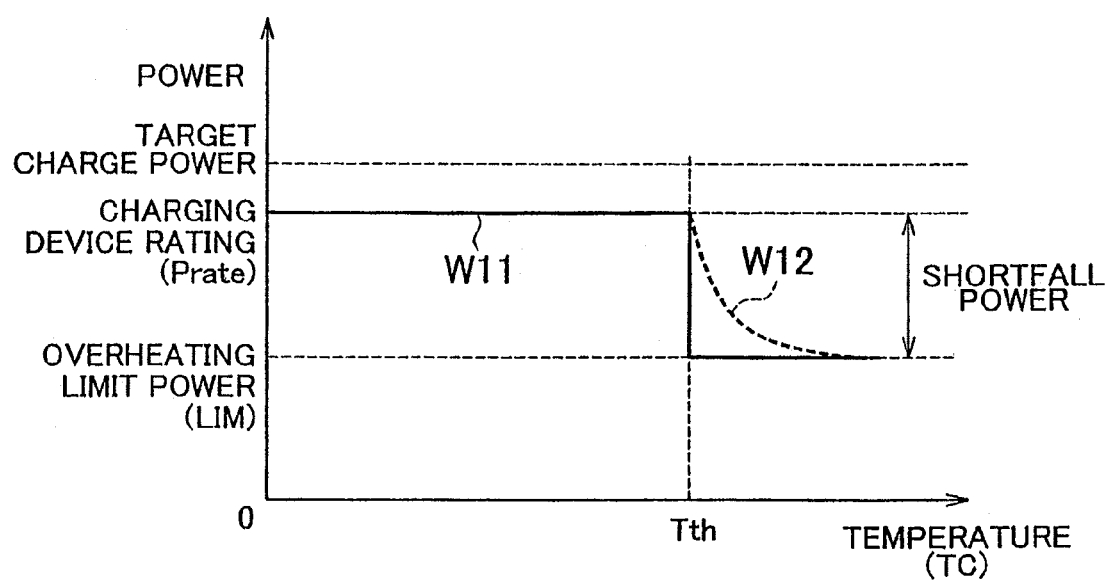
FIG. 6 is a diagram for explaining charge power decrease arising from a protective function of a charging device in Embodiment 2.

FIG. 6 is a diagram for explaining charge power decrease arising from a protective function of the charging device 200 in Embodiment 2. In FIG. 6, the abscissa axis represents a temperature TC of the charging device 200, and the ordinate axis represents output power of the charging device 200.

With reference to FIG. 6, for instance, the charging device 200 performs an operation of charging the electric storage device 110 by outputting rated output power, or power having a value close to the rated output power, when the temperature TC of the charging device 200 drops below a predefined reference temperature Tth for executing protection against overheating, in a case where the charge power upper limit value Win explained in Embodiment 1 is greater than the rated output power of the charging device 200, i.e. in a case where the target charge power, which is a target value of the power that is supplied to the electric storage device 110, is greater than the rated output power of the charging device 200.

When the temperature TC of the charging device 200 exceeds the reference temperature Tth, however, the charging device 200 lowers the outputtable power down to an overheating limit power LIM that is set for preventing overheating, in order to preclude deterioration or malfunction of the charging device 200. In this case, as shown in FIG. 6, the difference between the maximum outputtable power (i.e. the rated output power Prate) and the overheating limit power LIM yields a shortfall power. As in the explanation of FIG. 3 in Embodiment 1, the extension time ΔT may be obtained by multiplying the sampling time by the shortfall power with respect to the maximum outputtable power.

The target charge power may be lowered to be smaller than the rated output power of the charging device 200, for example, in a case where the charge power upper limit value Win is limited, with the SOC approaching a full charge state. In such a case, the extension time ΔT is calculated using the target charge power as the maximum outputtable power, instead of the rated output power Prate.

If the output power of the charging device 200 is limited when the temperature TC of the charging device 200 exceeds the reference temperature Tth, the output power may be reduced step-wise, as indicated by a solid line W11 in FIG. 6, or may be reduced gradually in accordance with increase in the temperature TC, as indicated by a broken line W12 in FIG. 6.

Information relating to charging time extension is stored in response to the overshoot of the accumulated value ΣΔT of the calculated extension times ΔT beyond the predefined threshold value.

Figure 7:
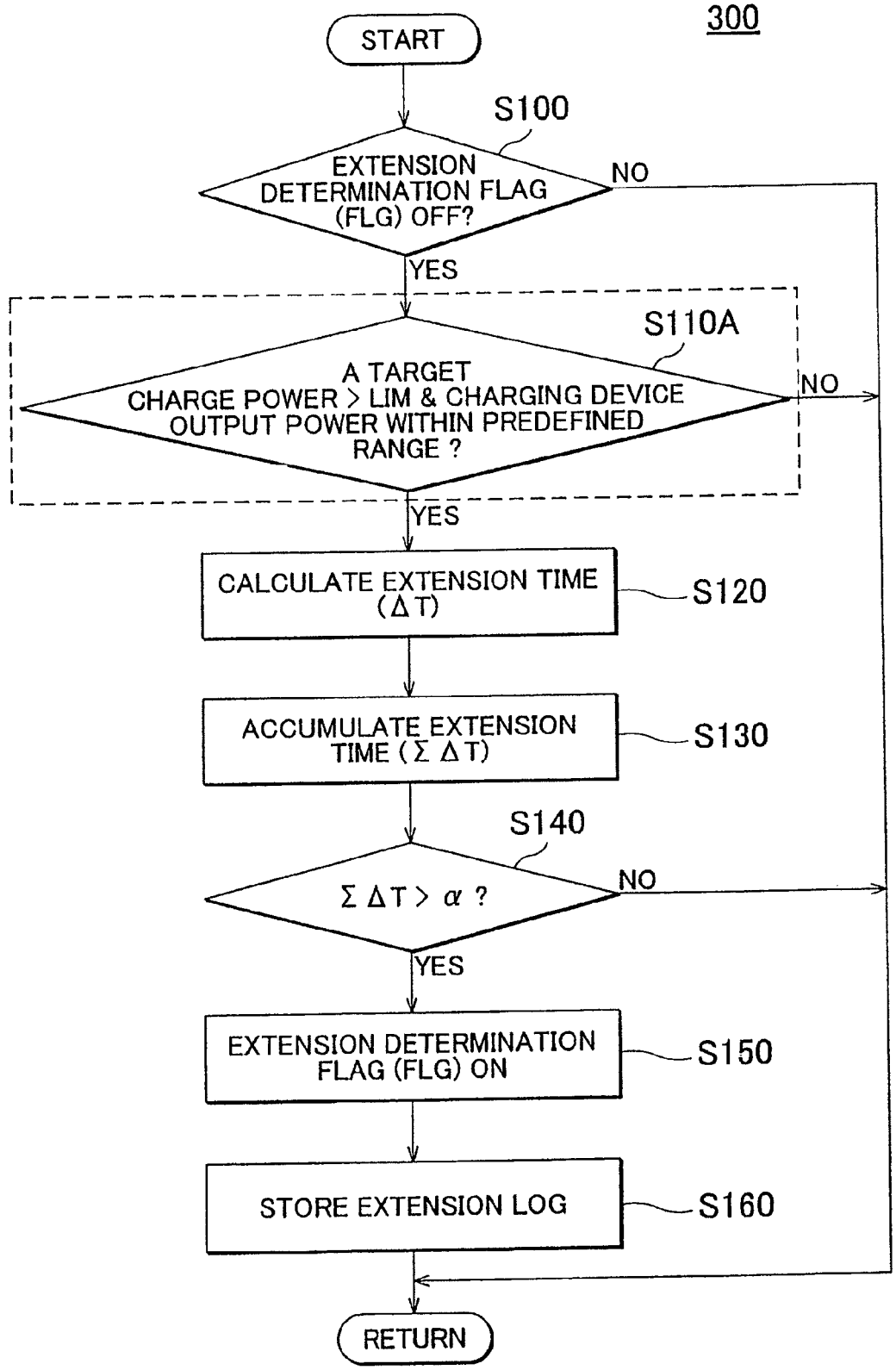
FIG. 7 is a flowchart for explaining in detail an extension time log control processing that is executed by the ECU in Embodiment 2.

FIG. 7 is a flowchart for explaining in detail the extension time log control processing that is executed by the ECU 300 in Embodiment 2. In the flowchart of FIG. 7, step S110 in the flowchart explained in FIG. 5 for Embodiment 1 is replaced by step S110A. Steps in FIG. 7 that overlap with those of FIG. 5 will not be explained in detail again.

With reference to FIGS. 1 and 7, if it is determined that the extension determination flag FLG is Off (YES in S100), the process proceeds to S110A, and the ECU 300 determines whether the target charge power is greater than the overheating limit power LIM and whether the output power of the charging device 200 lies within a predefined range.

Herein, for instance, the predefined range denotes a range smaller than the rated output power, in a case where the target charge power is greater than the rated output power of the charging device 200, and denotes a range smaller than the target charge power, in a case where the target charge power is smaller than the rated output power of the charging device 200.

If the target charge power is equal to or smaller than the overheating limit power LIM, or the output power of the charging device 200 does not lie within the predefined range (NO in S110A), then there is no charging time extension arising from an output power limitation in the charging device 200, and hence the process returns to the main routine.

By contrast, if the target charge power is greater than the overheating limit power LIM, and the output power of the charging device 200 lies within the predefined range (YES in S110A), the process proceeds to step S120, and the ECU 300 calculates the extension time ΔT derived from output power limitation in the charging device 200.

Thereafter, the ECU 300 accumulates the calculated extension times ΔT (S130). If the accumulated value ΣΔT exceeds the threshold value α (YES in S140), the ECU 300 sets the extension determination flag FLG to On (S150), and stores log information relating to charging time extension (S160). More specifically, the ECU 300 stores log information that indicates that charging time has been extended on account of output power limitation in the charging device. The log information includes information on the extension time.

By performing control according to the above-described processes, it becomes possible to store information relating to charging time extension arising from the output power limitation in the charging device on account of, for instance, a protective function of the charging device. The factor for extension of charging time can be identified retrospectively as a result.

(Embodiment 3)

When performing charging using the external power source, there are cases where, for example, the user utilizes auxiliary devices installed in the vehicle, such as an audio system and an air conditioner. During charging using the external power source, ordinarily, the auxiliary devices operate using part of the power that is supplied from the external power source via the charging device.

Part of the power outputted by the charging device is thus consumed by auxiliary devices, and hence the charge power that is supplied to the electric storage device is smaller than in a case where no auxiliary devices are used. Accordingly, the charging time may become extended as a result of such auxiliary devices being operated during charging using the external power source.

In Embodiment 3, there is explained an instance of storing log information relating to extension in a case where the charging time is extended on account of power consumption by auxiliary devices during charging using the external power source.

Figure 8:
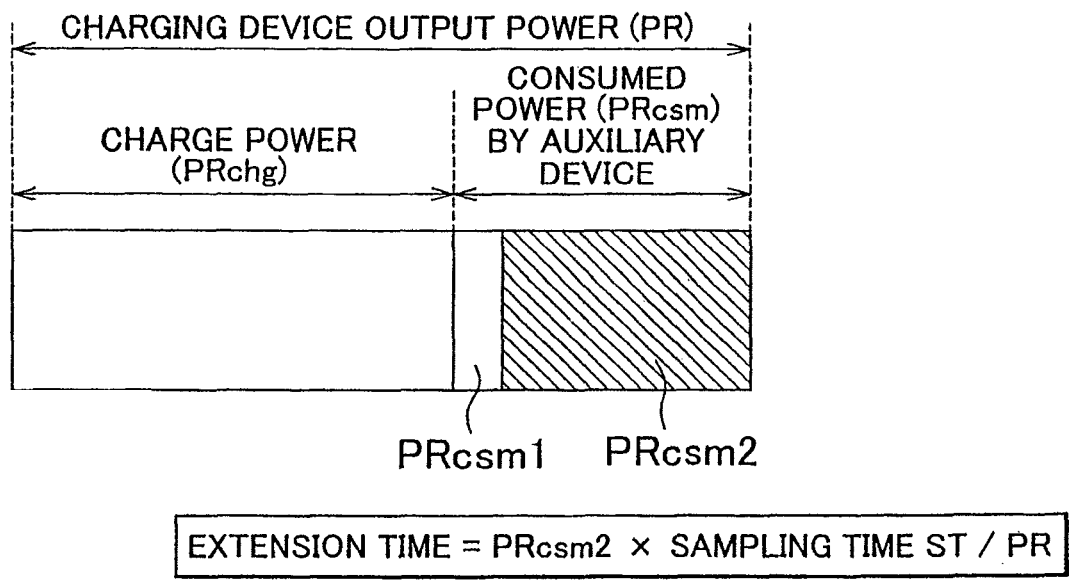
FIG. 8 is a diagram for explaining the extension time derived from power consumption by an auxiliary device in Embodiment 3.

FIG. 8 is a diagram for explaining extension time arising from power consumption by the auxiliary device 180 in Embodiment 3.

With reference to FIG. 8, output power PR from the charging device 200 during charging using the external power source can be broadly divided into charge power PRchg for charging the electric storage device 110 and consumed power PRcsm that is power consumed by auxiliary device 180. Further, the auxiliary consumed power PRcsm can be divided into a consumed power PRcsm1 for operating the charging device 200 and the ECU 300 that are necessary during the charging operation, and into consumed power PRcsm2 for operating an audio system, an air conditioner or the like, manipulated by the user.

The consumed power PRcsm1 is required in order to perform the charging operation, and hence the charging time is extended on account of the consumed power PRcsm2. Specifically, the extension time arising from power consumption by the auxiliary device, for each sampling time in the ECU 300, can be defined according to Expression (2) below, where ST denotes sampling time.

$$\Delta T = PRcsm2 \times ST/PR \quad (2)$$

Information relating to charging time extension is stored in response to the overshoot of the accumulated value ΣΔT of the calculated extension times ΔT beyond the predefined threshold value.

Figure 9:
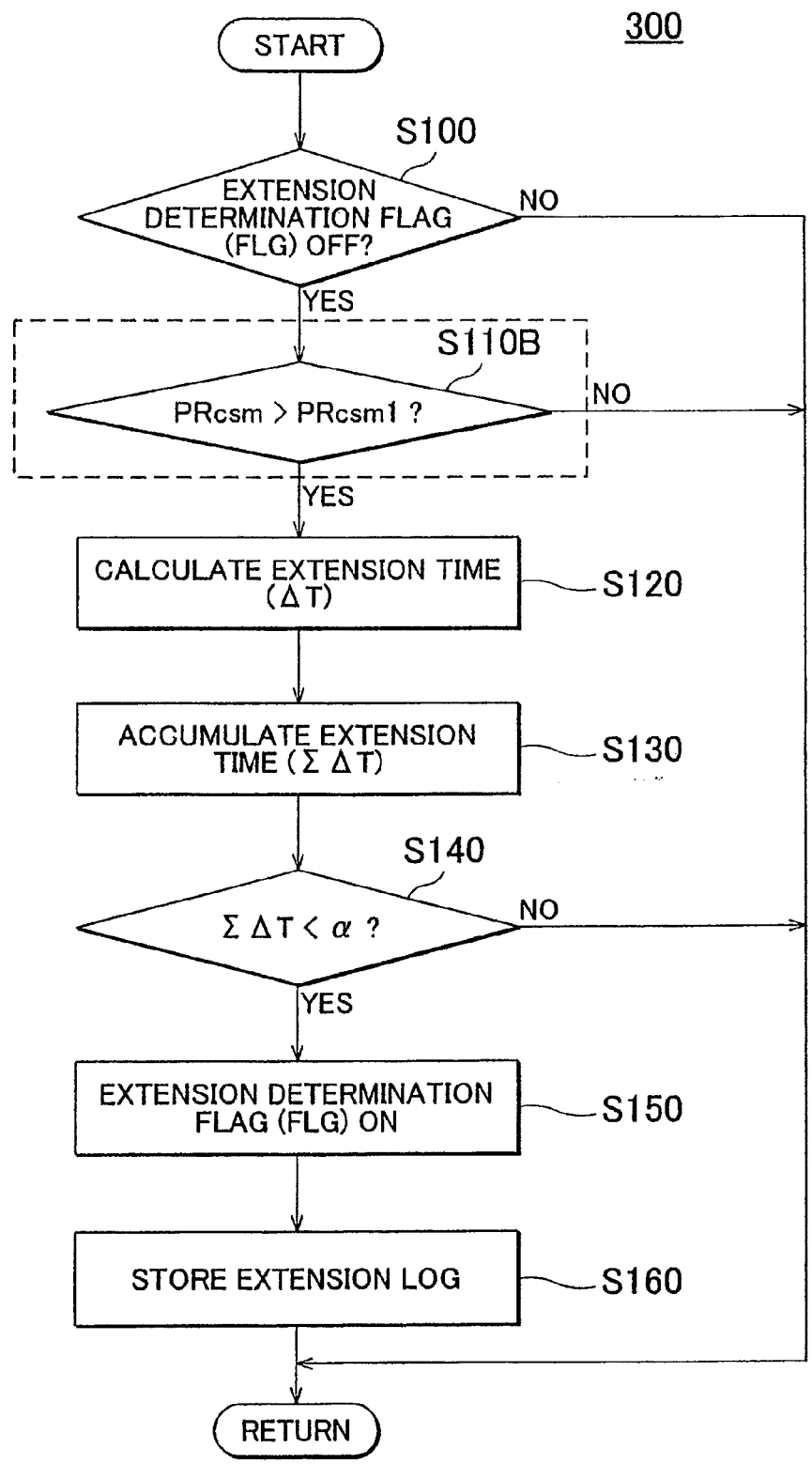
FIG. 9 is a flowchart for explaining in detail an extension time log control processing that is executed by the ECU in Embodiment 3.

FIG. 9 is a flowchart for explaining in detail the extension time log control processing that is executed by the ECU 300 in Embodiment 3. In the flowchart of FIG. 9, step S110 in the flowchart explained in FIG. 5 of Embodiment 1 is replaced by step S110B. Steps in FIG. 9 that overlap with those of FIG. 5 will not be explained in detail again.

With reference to FIGS. 1 and 9, if it is determined that the extension determination flag FLG is Off (YES in S100), the process proceeds to S110B, and the ECU 300 determines whether the consumed power PRcsm, which is the power consumed by the auxiliary device 180, is greater than the consumed power PRcsm1 necessary for the charging operation.

If the consumed power PRcsm, which is the power consumed by the auxiliary device 180, is equal to or smaller than the consumed power PRcsm1 (NO in S110B), there is no charging time extension on account of power consumption by the auxiliary device 180, and hence the process returns to the main routine.

By contrast, if the consumed power PRcsm, which is the power consumed by the auxiliary device 180, is greater than the consumed power PRcsm1 (YES in S110B), the process proceeds to step S120, and the ECU 300 calculates the extension time ΔT arising from power consumption in the auxiliary device 180, in accordance with a method such as the one illustrated in FIG. 8.

Thereafter, the ECU 300 accumulates the calculated extension times ΔT (S130). If the accumulated value ΣΔT exceeds the threshold value α (YES in S140), the ECU 300 sets the extension determination flag FLG to On (S150), and stores log information relating to charging time extension (S160). More specifically, the ECU 300 stores log information that indicates that charging time has been extended on account of the use of the auxiliary device 180 during charging using the external power source. The log information includes information on the extension time.

By performing control according to the above-described processes, it becomes possible to store information relating to charging time extension arising from the use of the auxiliary device during charging using the external power source. The factor for extension of charging time can be identified retrospectively as a result.

(Embodiment 4)

In Embodiments 1 to 3, instances of storing information relating to charging time extension have been explained for a case of charging time extension arising from lowering of the charge power upper limit value of the electric storage device, a case of charging time extension arising from the output power limitation in the charging device, and a case of charging time extension arising from power consumption by the auxiliary device, as respective separate cases.

However, the above-described individual factors for charging time extension are not necessarily limited to factors that occur independently from each other; at least two from among the above factors for charging time extension may occur simultaneously during a period of charging using an external power source, or a plurality of dissimilar factors for extension may occur not simultaneously but at dissimilar timings during a period of charging using an external power source.

In Embodiment 4, there is explained an instance of storing log information relating to extension in a case where there occurs a combination of the above-described three factors for charging time extension.

Figure 10:
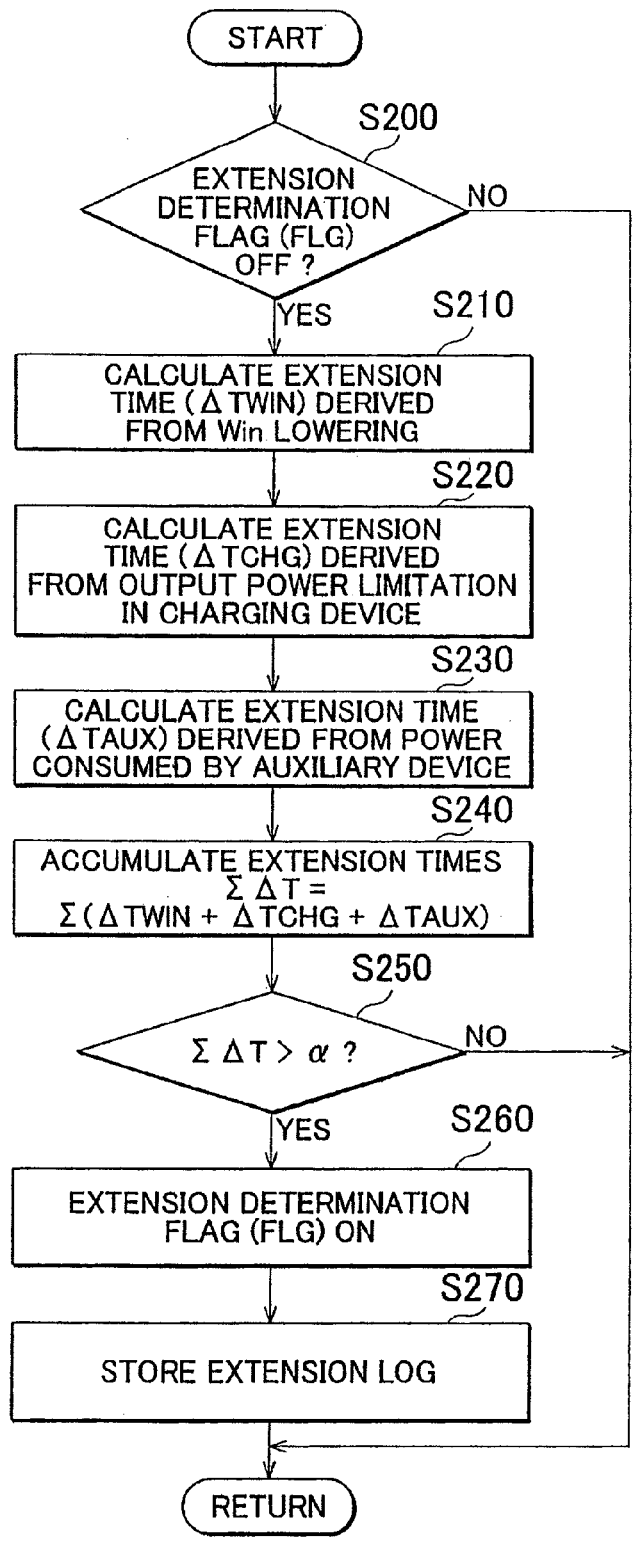
FIG. 10 is a flowchart for explaining in detail an extension time log control processing that is executed by the ECU in Embodiment 4.

FIG. 10 is a flowchart for explaining in detail the extension time log control processing that is executed by the ECU 300 in Embodiment 4.

With reference to FIGS. 1 and 10, the ECU 300 determines whether in step 200, the extension determination flag FLG is Off or not.

If the extension determination flag FLG is On (NO in S200), then extension of charging time using the external power source has already been detected, and hence the subsequent steps are skipped, and the process returns to the main routine.

If the extension determination flag FLG is Off (YES in S200), the process proceeds to step S210, and a extension time ΔTWIN arising from lowering of the charge power upper limit value Win is calculated in accordance with a process identical to that of Embodiment 1. If the charge power upper limit value Win is equal to or greater than a reference power, there is no charging time extension arising from the charge power upper limit value Win, and hence the extension time ΔTWIN is not calculated, or the extension time ΔTWIN is set to 0.

In S220, the ECU 300 calculates next an extension time ΔTCHG arising from the output power limitation in the charging device 200, in accordance with a process identical to that of Embodiment 2. If the target charge power is equal to or smaller than the overheating limit power LIM, or the output power of the charging device 200 does not lie within a predefined range, then there is no charging time extension arising from the output power limitation in the charging device 200, and hence the extension time ΔTCHG is not calculated, or the extension time ΔTCHG is set to 0.

In S230, the ECU 300 calculates an extension time ΔTAUX that arises on account of power consumption by the auxiliary device 180, in accordance with a method identical to that of Embodiment 3. If the consumed power PRcsm, which is the power consumed by the auxiliary device 180, is equal to or smaller than the consumed power PRcsm1, there is no charging time extension on account of power consumption by the auxiliary device 180, and hence the extension time ΔTAUX is not calculated, or the extension time ΔTAUX is set to 0.

In S240, the ECU 300 accumulates the sum total of the extension times calculated in S210, S220, S230 according to Expression (3) below.

$$\Sigma \Delta T = \Sigma(\Delta TWIN + \Delta TCHG + \Delta TAUX) \quad (3)$$

In S250, the ECU 300 determines whether the accumulated value ΣΔT accumulated in S240 is greater than the predefined threshold value α.

If the accumulated value ΣΔT is equal to or smaller than the threshold value α (NO in S250), the process in the ECU 300 returns to the main routine, and accumulation of the extension time is continued.

If the accumulated value ΣΔT is greater than the threshold value α (YES in S250), the process proceeds to step S260, and the ECU 300 sets the extension determination flag FLG to On. In S270, the ECU 300 stores log information relating to charging time extension.

In S270, preferably, the extension times (ΔTWIN, ΔTCHG, ΔTAUX) arising from respective factors for charging time extension are stored separately.

By performing control according to the above-described processes, it becomes possible to store information relating to charging time extension in a case where there may occur a combination of a plurality of factors for extension during charging using the external power source. As a result, the factors for the extension of charging time, if any, can be identified retrospectively.

In the explanation of Embodiment 4 above, determination relating to extension time is performed by summing the extension times arising from the three factors for charging time extension, but determination may also be performed in consideration of any two factors from among the three factors. If there exists another factor for extension other than the above-described three factors for charging time extension, the additional factor for extension may also be considered.

In the above-described embodiments, a method has been explained wherein the extension amount of charging time is taken as a parameter, but the parameter may be a shortfall of charge power.

Thus, the embodiments of the invention that have been disclosed in the specification are to be considered in all respects as illustrative and not restrictive. The technical scope of the invention is defined by claims, and all changes which come within the meaning and range of equivalency of the claims are therefore intended to be embraced therein.

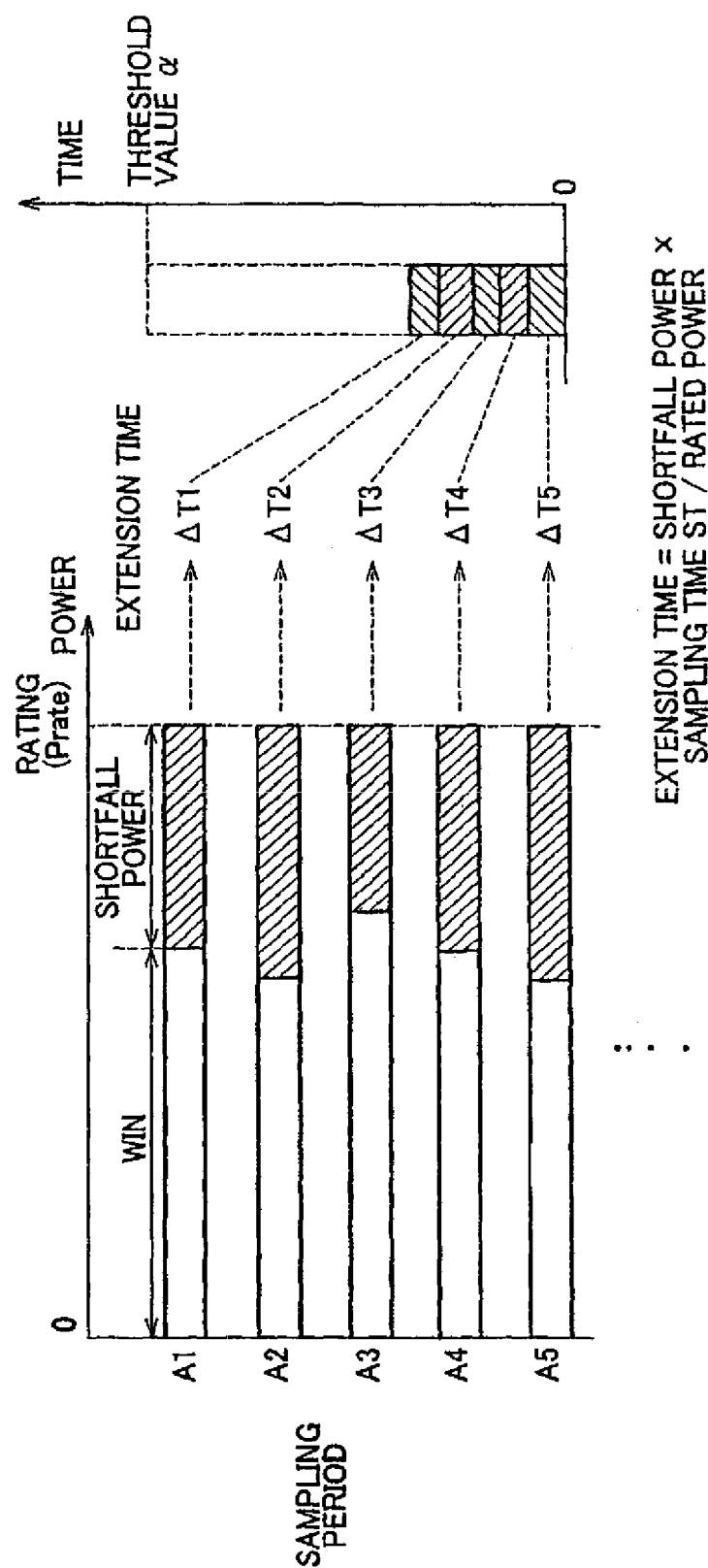

The invention claimed is:

1. A vehicle that is chargeable using power from an external power source, comprising:
   a chargeable electric storage device;
   a charging device that charges the electric storage device by using the power from the external power source; and
   a control device that, based on maximum supply power that is able to be supplied to the electric storage device and based on actual charge power actually supplied to the electric storage device, calculates a shortfall with respect to charge power supplied to the electric storage device in a case where charging is performed at the maximum supply power, and stores information relating to a causal factor for the shortfall.

2. The vehicle according to claim 1, wherein the control device stores the information when an accumulated value, which results from accumulating over time a value based on the shortfall calculated for every predefined sampling period, exceeds a predefined threshold value.

3. The vehicle according to claim 2, wherein the causal factor for the shortfall includes a shortage of the charge power arising from lowering of a charge power upper limit value of the electric storage device.

4. The vehicle according to claim 2, wherein the causal factor for the shortfall includes a shortage of the charge power arising from a limitation imposed on output power of the charging device.

5. The vehicle according to claim 4, wherein the causal factor for the shortfall includes the shortage of the charge power arising from the limitation imposed on the output power of the charging device to protect the charging device against overheating.

6. The vehicle according to claim 2, further comprising:
   an auxiliary device configured to be operated using output power of the charging device during a charging operation, wherein the causal factor for the shortfall includes a shortage of the charge power arising from power consumption by the auxiliary device in a case where the auxiliary device is used during the charging operation.

7. The vehicle according to claim 2, wherein the control device calculates, as the value based on the shortfall, an amount of extension from charging time required in the case where charging is performed at the maximum supply power, and stores the information, as information on a factor for extension, when the extension amount exceeds the threshold value.

8. The vehicle according to claim 7, wherein the information on the factor for extension includes the causal factor for the shortfall and information on the extension amount that arises from the shortfall.

9. The vehicle according to claim 2, wherein when a predefined condition is satisfied, the control device calculates the shortfall based on the maximum supply power that is able to be supplied to the electric storage device and based on the actual charge power actually supplied to the electric storage device.

10. The vehicle according to claim 9, wherein
the predefined condition is a condition in which a charge power upper limit value of the electric storage device drops below the maximum supply power; and
when the predefined condition is satisfied and the accumulated value exceeds the predefined threshold value, the control device stores the information that indicates that the causal factor for the shortfall is a shortage of the charge power arising from lowering of the charge power upper limit value of the electric storage device.

11. The vehicle according to claim 9, wherein
the predefined condition is a condition in which a target charge power, which is a target value of the charge power supplied to the electric storage device, is greater than an overheating limit power that is set for preventing overheating of the charging device, and in which output power of the charging device lies within a predefined range, and
when the predefined condition is satisfied and the accumulated value exceeds the predefined threshold value, the control device stores the information that indicates that the causal factor for the shortfall is a shortage of the charge power arising from a limitation imposed on the output power of the charging device to protect the charging device against overheating.

12. The vehicle according to claim 9, further comprising:
an auxiliary device configured to be operated using output power of the charging device during a charging operation, wherein
the predefined condition is a condition in which power consumed by the auxiliary device is greater than power necessary for a charging operation, and
when the predefined condition is satisfied and the accumulated value exceeds the predefined threshold value, the control device stores the information that indicates that the causal factor for the shortfall is a shortage of the charge power arising from power consumption by the auxiliary device in a case where the auxiliary device is used during the charging operation.

13. The vehicle according to claim 1, further comprising:
an auxiliary device configured to be operated using output power of the charging device during a charging operation, wherein
the causal factor for the shortfall includes at least one from among a first factor which is a shortage of the charge power arising from lowering of a charge power upper limit value of the electric storage device, a second factor which is a shortage of the charge power arising from a limitation imposed on output power of the charging device to protect the charging device against overheating, and a third factor which is a shortage of the charge power arising from power consumption by the auxiliary device in a case where the auxiliary device is used during the charging operation, and
the control device stores the information on each of the first factor, the second factor, and the third factor, when an accumulated value, which results from accumulating over time a total sum value of values that are based on respective shortfalls due to the first factor, the second factor, and the third factor calculated for every predefined sampling period, exceeds a predefined threshold value.

14. The vehicle according to claim 1, further comprising:
a display device that displays information that relates to the causal factor for the shortfall and that is stored in the control device, wherein
the control device notifies a user of the vehicle of the information by displaying the information on the display device.

15. A method for controlling a vehicle equipped with an electric storage device that is chargeable using power from an external power source,
the method comprising:
calculating, based on maximum supply power that is able to be supplied to the electric storage device and based on actual charge power actually supplied to the electric storage device, a shortfall with respect to charge power supplied to the electric storage device in a case where charging is performed at the maximum supply power, and
storing information relating to a causal factor for the shortfall.

* * * * *

UNITED STATES PATENT AND TRADEMARK OFFICE
CERTIFICATE OF CORRECTION

PATENT NO.       : 9,106,091 B2
APPLICATION NO.  : 13/980664
DATED            : August 11, 2015
INVENTOR(S)      : N. Mitsutani et al.

It is certified that error appears in the above-identified patent and that said Letters Patent is hereby corrected as shown below:

In the Drawings

Delete Drawing figure 3, and replace with Drawing figure 3. (attached)

Signed and Sealed this
Twelfth Day of July, 2016

Michelle K. Lee
*Director of the United States Patent and Trademark Office*